US009915091B2

(12) United States Patent
Gantman et al.

(10) Patent No.: US 9,915,091 B2
(45) Date of Patent: Mar. 13, 2018

(54) LOW POWER ENVIRONMENT MANAGEMENT FOR AN AUTOMOBILE

(71) Applicant: LENOVO (Singapore) PTE, LTD., New Tech Park (SG)

(72) Inventors: Russell Stuart Gantman, Fuquay Varina, NC (US); Jason Grimme, Cary, NC (US); Russell Speight VanBlon, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 264 days.

(21) Appl. No.: 14/142,468

(22) Filed: Dec. 27, 2013

(65) Prior Publication Data

US 2015/0184442 A1 Jul. 2, 2015

(51) Int. Cl.

| | |
|---|---|
| ***B60H 1/00*** | (2006.01) |
| ***B60H 1/24*** | (2006.01) |
| ***E05F 17/00*** | (2006.01) |
| ***E05F 15/71*** | (2015.01) |

(52) U.S. Cl.

CPC .............. *E05F 17/00* (2013.01); *E05F 15/71* (2015.01); *E05Y 2400/42* (2013.01); *E05Y 2900/55* (2013.01)

(58) Field of Classification Search

None

See application file for complete search history.

(56) References Cited

U.S. PATENT DOCUMENTS

| | | | | |
|---|---|---|---|---|
| 5,275,012 | A * | 1/1994 | Dage | B60H 1/00392 219/202 |
| 5,330,385 | A * | 7/1994 | Hotta | B60H 1/00392 165/42 |
| 6,138,068 | A * | 10/2000 | Liu | B60H 1/245 236/44 C |
| 6,195,603 | B1 * | 2/2001 | Gauger | B60N 2/0248 296/68.1 |
| 6,345,767 | B1 * | 2/2002 | Burrus, IV | B60H 1/00735 236/1 R |
| 6,472,836 | B1 * | 10/2002 | Uebelein | H02H 7/0851 318/434 |
| 6,737,975 | B2 * | 5/2004 | Pelletier | B60N 2/002 280/730.2 |
| 6,840,052 | B2 * | 1/2005 | Smith | F24F 11/001 236/94 |
| 7,451,610 | B2 * | 11/2008 | Kubo | B60H 1/3205 62/228.1 |
| 7,658,670 | B1 * | 2/2010 | Brown | B60H 1/267 454/124 |
| 8,849,505 | B2 * | 9/2014 | Menard | B60J 7/0573 307/9.1 |
| 9,000,907 | B1 * | 4/2015 | Rembach | B60N 2/002 180/273 |
| 9,159,232 | B2 * | 10/2015 | Ricci | G06F 9/54 |
| 2002/0143452 | A1 * | 10/2002 | Losey | B60J 7/0573 701/49 |

(Continued)

*Primary Examiner* — Navid Ziaeianmehdizadeh

(74) *Attorney, Agent, or Firm* — Kunzler, PC

(57) ABSTRACT

For low power environment management for an automobile, a method is disclosed that includes sensing an environmental condition at an automobile, comparing a level of the environmental condition to a selected threshold value, and adjusting the opening of one or more windows of the automobile based on the sensed environmental condition.

20 Claims, 8 Drawing Sheets

(56) References Cited

U.S. PATENT DOCUMENTS

| | | | | |
|---|---|---|---|---|
| 2002/0161501 | A1* | 10/2002 | Dulin | B06B 1/0215 701/45 |
| 2003/0098784 | A1* | 5/2003 | Van Bosch | B60R 25/1004 340/425.5 |
| 2007/0057809 | A1* | 3/2007 | Su | G08C 17/02 340/12.22 |
| 2007/0255468 | A1* | 11/2007 | Strebel | B60N 2/002 701/49 |
| 2009/0286459 | A1* | 11/2009 | Major | B60H 1/00428 454/75 |
| 2010/0023204 | A1* | 1/2010 | Basir | G06F 1/3203 701/31.4 |
| 2010/0089563 | A1* | 4/2010 | Sundhar | B60H 1/00428 165/202 |
| 2010/0102630 | A1* | 4/2010 | Turski | H02J 7/0032 307/10.7 |
| 2011/0151761 | A1* | 6/2011 | Lesle | B60H 1/00428 454/75 |
| 2011/0297339 | A1* | 12/2011 | Yi | B60J 1/2011 160/370.21 |
| 2012/0085830 | A1* | 4/2012 | Sundhar | B60H 1/3222 236/49.3 |
| 2012/0116608 | A1* | 5/2012 | Park | B60H 1/00657 701/2 |
| 2013/0068443 | A1* | 3/2013 | Yen | B60H 1/00392 165/253 |

* cited by examiner

LOW POWER ENVIRONMENT MANAGEMENT FOR AN AUTOMOBILE

FIELD

The subject matter disclosed herein relates to automobile conditioning and more particularly relates to low power environment management for an automobile.

BACKGROUND

Description of the Related Art

Automobiles permeate almost every industry in current society. In some warmer climates, exposure to direct sunlight may dramatically increase an internal temperature of an automobile. Excessively hot temperatures in an automobile may damage interior components, and may require significant cooling to return the vehicle to a more comfortable temperature range for the driver. Furthermore, excessive heat in the automobile can be very uncomfortable for occupants of the automobile.

In one solution, a driver may place a sun shade at windows of the automobile. Although this may affect temperature increase in the automobile, air in the automobile may continue to increase in temperature and may not escape. In another solution, a driver may start the automobile remotely, and may begin conditioning air, however, this may require significant amount of fuel and/or energy to reduce the temperature of the automobile to a comfortable level.

BRIEF SUMMARY

An apparatus for low power environment management for an automobile is disclosed. A method and computer program product also perform the functions of the apparatus.

In one embodiment, the apparatus includes an environment module that senses an environmental condition at an automobile. In another embodiment, the apparatus includes a threshold module that compares a level of the environmental condition to a selected threshold value. In a further embodiment, the apparatus includes a cooling module that adjusts an opening of one or more windows of the automobile based on the sensed environmental condition.

In one embodiment, the apparatus includes a state module that monitors a state of the automobile. In another embodiment, the environment module senses the environmental condition in response to the state. In a further embodiment, the apparatus includes a configuration parameter module that stores configuration parameters. In another embodiment, the configuration parameters include environment settings, threshold values, and adjustment settings, the environment module sensing based on the environment settings, the cooling module adjusting based on the adjustment settings.

In another embodiment, the apparatus further includes an air flow module that enables a fan in response to the environmental condition comprising temperature. In a further embodiment, the temperature exceeds the selected threshold value. In one embodiment, the apparatus includes a reserve power module that determines an amount of reserve power available. In another embodiment, the cooling module opens the one or more windows based on the amount of reserve power available.

In one embodiment, the cooling module opens the one or more windows in response to a user of the automobile approaching the automobile. In another embodiment, the cooling module adjusts the opening by lowering one or more windows substantially down. In another embodiment, the environment module senses in response to an initiation event. In one embodiment, the initiation event is selected from the group consisting of a user turning off the automobile, the user locking the automobile, and the user remotely commanding the automobile.

In one embodiment, the environment module senses the environmental condition based on the automobile being powered off, the environmental condition comprising temperature, the cooling module opening one or more windows in response to the temperature exceeding a selected temperature threshold. In another embodiment, an opening of the one or more windows includes one or more windows being opened less than 0.5 inches.

A method for low power environment management for an automobile is disclosed that includes sensing an environmental condition at an automobile. In another embodiment, the method includes comparing a level of the environmental condition to a selected threshold value. In a further embodiment, the method includes adjusting the opening of one or more windows of the automobile based on the sensed environmental condition.

In one embodiment, the method further includes determining to initiate low power environment management in the automobile based on a state of the automobile. In another embodiment, the environmental condition is selected from the group consisting of temperature, humidity, light, and precipitation. In one embodiment, the method includes receiving a set of configuration parameters, the configuration parameters selected from the group consisting of sensor settings, comparison settings, and adjustment settings.

In another embodiment, the method includes closing one or more windows of the automobile in response to a terminating event. In one embodiment, the terminating event selected from the group consisting of a user returning to the automobile, exceeding a time threshold, insufficient reserve power, and meeting a temperature threshold.

In one embodiment, the method includes monitoring an amount of reserve power for the automobile, the adjusting based on the amount of available reserve power. In another embodiment, the method includes closing the windows of the automobile in response to the environmental condition comprising precipitation. In a further embodiment, the method includes starting a fan for the automobile, wherein the environmental condition comprises temperature, the temperature exceeding a temperature threshold. In one embodiment, the method includes returning windows of the car to a default position in response to a user of the automobile starting the automobile.

A program product is disclosed including a computer readable storage medium storing machine readable code executable by a processor to perform operations. In one embodiment, the operations include sensing an environmental condition at an automobile. In another embodiment, the operations include comparing a level of the environmental condition to a selected threshold value. In a further embodiment, the operations include adjusting the opening of one or more windows of the automobile based on the sensed environmental condition.

In one embodiment, the operations include monitoring an amount of reserve power for the automobile, the adjusting based on the amount of available reserve power. In a further embodiment, the operations include closing the windows of the automobile in response to determining that there is an insufficient amount of available reserve power.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
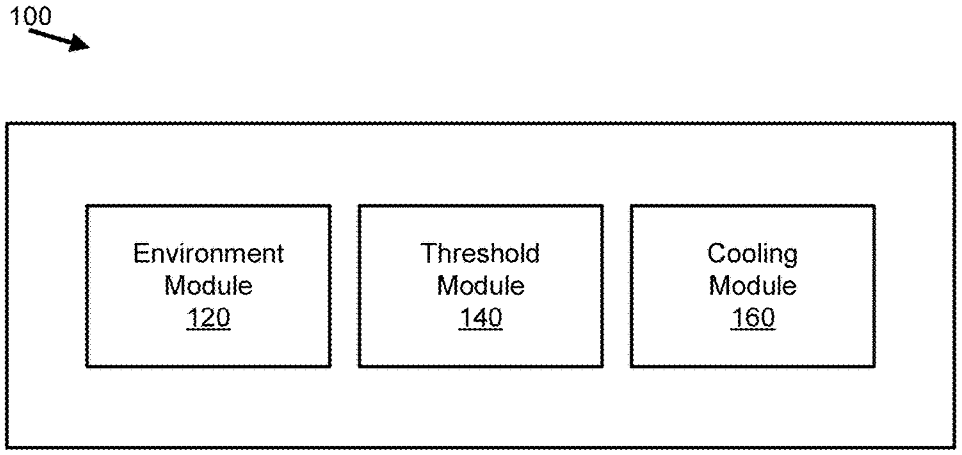
FIG. 1 is a schematic block diagram illustrating one embodiment of an apparatus for low power environment management for an automobile.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of Figures may refer to elements described in previous Figures, like numbers referring to like elements.

In order to address the current state of the art, the present application discloses several embodiments of a method, and apparatus for low power environment management for an automobile.

FIG. 1 is a schematic block diagram illustrating one embodiment 100 of an apparatus for low power environment management for an automobile. In one embodiment, the apparatus 100 includes an environment module 120, a threshold module 140, and a cooling module 160.

In one embodiment, the environment module 120 may be configured to sense an environmental condition at an automobile. In certain embodiments, the environment module 120 may sense any kind of climate, environmental, meteorological, weather, atmospheric, or other condition, or the like. In certain examples, the environment module 120 may sense temperature, humidity, precipitation, light, or the like. In other embodiment, the environment module 120 may sense an environmental condition either outside or inside an automobile. In one example, the environment module 120 may sense an air temperature outside of the automobile and an air temperature inside the automobile.

In other embodiments, the body of the automobile may house a processor and various environmental sensors described herein. The automobile may include the environmental module 120. In further embodiments, the automobile may house a motor that may translate the automobile body. In another embodiment, the body of the automobile may include windows. As one skilled in the art may appreciate, a motor for the automobile may include a gasoline engine, a diesel engine, an electric motor, a hybrid motor, or other, or the like. In other embodiments, the automobile may house several motors that may cooperate in order to translate the automobile body.

In other embodiments, the environmental module 120 may communicate with various sensors housed in the automobile body to sense the environmental condition. For example, the environment module 120 may receive a temperature value from one or more thermocouples. In another example, the environment module 120 may receive a humidity value from a humidity sensor. In another example, the environment module 120 may receive a precipitation value from a precipitation sensor. In another example, the environment module 120 may receive a light value from a light sensor, such as, but not limited to a photoreceptor.

In certain embodiment, the environment module 120 may sense many different environment properties concurrently. For example, the environment module 120 may sense temperature and humidity concurrently. In another example, the environment module 120 may sense temperature and precipitation concurrently. In another example, the environment module 120 may sense temperature, humidity, precipitation, and light concurrently. Of course, other combinations may be used as one skilled in the art may appreciate.

In another embodiment, the environment module 120 may determine a human perceived equivalent temperature based on an air temperature and a relative humidity. A heat index may more accurately reflect what an environmental condition "feels like" to a person in the automobile. This perceived equivalent temperature may be a heat index. In certain examples, the environment module 120 may determine a heat index based on a heat index table, using temperature and relative humidity values to determine the heat index. In other examples, the environment module 120 may use a mathematical model to determine a heat index value as one skilled in the art may appreciate.

In one embodiment, the environment module 120 may sense an environmental condition in response to an initiation event. An initiation event, in one example, may include a user of the automobile turning off the automobile. In another example, an initiation event may include the user locking or otherwise securing the automobile. In one example, an initiation event may include the user remotely commanding the environment module 120. In certain examples, remotely commanding the automobile may include transmitting a signal to the automobile to initiate a low power environment management system in accordance with the present disclosure. In another example, an initiation event may include a state of the automobile as will be subsequently described.

On one example, a user of the automobile may power off the automobile, and the environment module 120 may begin sensing the internal temperature of the cabin of the automobile. The threshold module 140 may compare the internal air temperature of the cabin of the automobile with a threshold temperature value. In response to the internal air temperature of the cabin of the automobile exceeding the threshold temperature value, the cooling module 160 may lower two windows approximately ½ inch. Of course, the cooling module 160 may lower windows other distances, such as, but not limited to ¼inch, 1 inch, or other, and this disclosure is not limited in this regard.

In another embodiment, the apparatus 100 includes the threshold module 140 configured to compare a level of the environmental condition to a selected threshold value. In one embodiment, a selected threshold value may be a temperature. For example, the selected threshold value may be 100 degrees Fahrenheit. In another example, the selected threshold temperature value may be 130 degrees Fahrenheit. Of course, the selected threshold value may be lower or higher and this disclosure is not limited in this regard.

In another embodiment, the selected threshold value may be a humidity value. For example, the environment module 120 may measure a relative humidity, and the threshold module 140 may compare the measured relative humidity to the humidity threshold value. For example, the environment module 120 may measure a relative humidity of 95% and the humidity value threshold may be 90%. In this example, the threshold module 140 may determine that the measured humidity value exceeds the humidity value threshold.

In another embodiment, the threshold value may include a heat index threshold value. The environment module 120 may measure, inside the automobile, an air temperature, and a relative humidity. The threshold module 140 may calculate a heat index value inside the automobile and compare the heat index threshold value to the heat index threshold value. In one example, a threshold value may be heat index value of 90 degrees Fahrenheit, a measured temperature may be 85 degrees Fahrenheit, and a relative humidity may be 90%. Therefore, the threshold module 140 may calculate a heat index value inside the automobile from the measured air temperature and relative humidity and compare the resulting heat index value to the heat index threshold value of 90 degrees Fahrenheit.

In other embodiments, the threshold value may include a temperature value, a humidity value, a precipitation value, a light value, or the like. The threshold module 140 may compare a measured value to the threshold value in any of the aforementioned manners, or other, or the like.

In another embodiment, the threshold module 140 may automatically generate a threshold value based on a value differential. For example, an air temperature may be 90 degrees Fahrenheit, and a value differential maybe 20 degrees Fahrenheit. Therefore, in one example, the threshold module 140 may generate a threshold value of 110 degrees Fahrenheit based on the measured air temperature and the threshold value differential.

In another embodiment, the threshold module 140 may manage many different threshold values. For example, the threshold module 140 may manage a temperature threshold that indicates to the cooling module 160 to open one or more windows, another threshold value that indicates to the cooling module 160 to open more windows, or open windows more, another threshold value that indicates to the cooling module 160 to enable a fan to facilitate air flow in the vehicle, and another threshold value that indicates to close the windows.

In another embodiment, the threshold module 140 may store a low reserve power threshold value. As will be subsequently described regarding a reserve power module 280 (FIG. 2), the threshold module 140 may also store settings and threshold values regarding the amount of reserve power available and compare that amount to a stored reserve power threshold value.

In another embodiment, the threshold module 140 may store a time limit for one or more modules to operate. For example, the threshold module 140 may store a time limit for an air flow module 260 (FIG. 2) to operate one or more fans for the automobile. This may further limit the amount of reserve power used for the automobile, and may limit wear or use of the fan. For example, the time limit may be one week, or shorter, or longer, based at least in part, on preferences of the user, an amount of reserve power available, or the like. For example, with little reserve power available, the time limit may be shorter, and with significant reserve power available, the time limit may be longer.

In one embodiment, the apparatus 100 includes the cooling module 160 configured to adjust an opening of one or more windows of the automobile based on the sensed environmental condition. In one embodiment, the cooling module 160 may lower one or more windows of the automobile based on a measured temperature exceeding a temperature threshold value. In one example, the environment module 120 may sense an air temperature inside the automobile, and the threshold module 140 may compare the sensed air temperature value to a temperature threshold value. In this example, the cooling module 160 may lower one or more windows of the automobile based on the measured temperature exceeding the temperature threshold value.

In another embodiment, the cooling module 140 may manage many different threshold values. For example, the threshold module 140 may manage a temperature threshold that indicates to the cooling module 160 to open one or more windows in response to the threshold value being exceeded. In another example, the threshold value indicates to the cooling module 160 to open more windows, or open windows more based on the threshold value being exceeded. In another example, the threshold value indicates to the cooling module 160 to enable a fan to facilitate air flow in the vehicle based on the threshold value being exceeded. In another example, the threshold value indicates to close the windows in response the air temperature inside the vehicle falling below the threshold temperature value.

The cooling module 160 in other embodiments, may adjust one or more of the windows of the automobile based on any of the aforementioned environmental conditions. In one example, the cooling module 160 may partially lower two windows on opposing sides of the automobile. In another example, the cooling module 160 may partially lower all the windows in the automobile. In another example, the cooling module 160 may partially open a sunroof of the automobile. In another embodiment, the cooling module 160 may open one or more windows in combination with opening a sunroof, or other, or the like. Of course, other combinations of windows may be opened by the cooling module 160, and this disclosure is not limited in this regard.

In another example, the environment module 120 may sense precipitation at the automobile. Precipitation may include rain, snow, sleet, hail, or the like. In this example, the cooling module 160 may close one or more windows of the automobile in response to the environment module 120 sensing precipitation. The cooling module 160 closing one or more windows in response to precipitation may or may not be after the cooling module 160 had opened one or more windows or sunroofs of the automobile.

In another embodiment, the environment module 120 may sense an ambient light at the automobile. For example, the environment module 120 may sense that the sun is down, and the cooling module 160 may not adjust one or more of the windows of the automobile.

In one embodiment, the cooling module 160 may prioritize many different environment conditions. In one example, the cooling module 160 prioritize a precipitation environmental condition with an air temperature condition. An air temperature may exceed an air temperature threshold, and a precipitation value may exceed a precipitation threshold. The cooling module may close one or more windows of the automobile based on the precipitation threshold being exceeded even though a current heat index inside the automobile may exceed a heat index threshold value.

In another embodiment, the cooling module 160 may close one or more opened windows of the automobile in response to the air temperature inside the automobile falling below a temperature threshold, a heat index threshold, or the like.

In another embodiment, the cooling module 160 may open one or more windows in the automobile in response to an owner of the automobile approaching the automobile. In one example, the cooling module 160 may determine that an owner of the vehicle is approaching the vehicle using a global positioning system (GPS), and may lower one or more windows substantially down. In another example, the cooling module 160 may determine that an owner, user, driver, or occupant of the vehicle is approaching the vehicle using a remote control device, wireless key, or the like.

In one embodiment, the cooling module may close windows of the automobile in response to a security alarm for the automobile being triggered. In one example, after a period of time, the cooling module may then again lower one or more windows of the automobile based on the environment module 120 sensing an environmental condition. In another embodiment, the cooling module 160 may raise one or more windows of the automobile in response to a proximity sensor sensing a presence of one or more persons near the automobile. The proximity sensor may also sense noise, or motion near the automobile.

Figure 2:
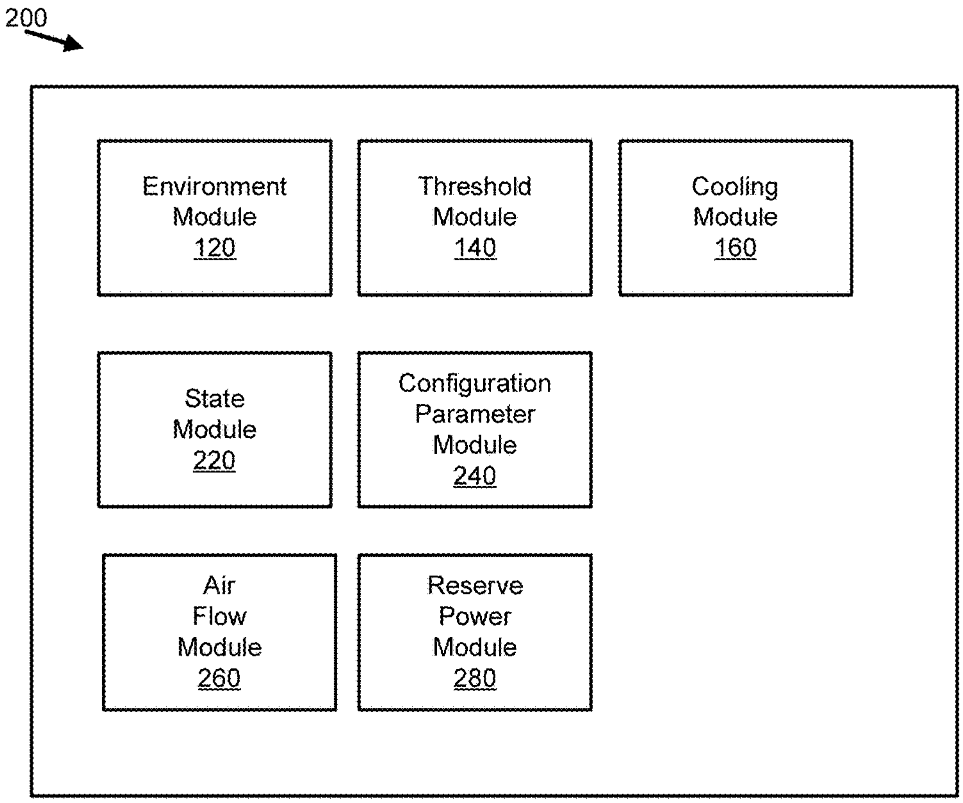
FIG. 2 is another schematic block diagram illustrating one embodiment of an apparatus for low power environment management for an automobile.

FIG. 2 is another schematic block diagram illustrating one embodiment 200 of an apparatus for low power environment management for an automobile. In one embodiment, the apparatus 200 includes the environment module 120, the threshold module 140, the cooling module 160, a state module 220, a configuration parameters module 240, an air flow module 260, and a reserve power module 280. The environment module 120, the threshold module 140, and the cooling module 160 may or may not be substantially similar to modules depicted in FIG. 1.

In one embodiment, the apparatus 200 may include a state module 220 configured to monitor a state of the automobile, the environment module 120 sensing the environmental condition in response to the state. In one embodiment, the state of the automobile includes the automobile being powered off. In another embodiment, the state of the automobile may include a security alarm being set for the automobile. In another embodiment, the state of the automobile includes a user initiating system in accordance with one embodiment of the present disclosure. For example, a user may press a button on a remote control module for the automobile, and the environment module 120 may begin sensing the environmental condition after receiving a signal from the remote control module.

In another embodiment, the state of the automobile includes an engine of the automobile being turned off and one or more of the windows for the automobile already being at least partially lowered. In another embodiment, a state of the automobile may include a person located in the automobile. In one example, the cooling module 160 may not lower one or more windows of the automobile based on a user being in the automobile.

In one embodiment, the apparatus 200 may include the configuration parameter module 240 configured to store configuration parameters. In certain embodiments, the configuration parameters may include environment settings, threshold values, adjustment settings, power settings, and time settings. In another embodiment, the environment module 120 may begin sensing based on the environment settings. In a further embodiment, the cooling module 160 may adjust based on the adjustment settings.

In one embodiment, the configuration parameters module 240 may store or receive configuration parameters for environment settings. Environment settings may, in certain embodiments, include environmental conditions that the environment module 120 is to sense. For example, a user may set configuration parameters to indicate that the environment module 120 should sense temperature, but not to sense humidity. In another example, a user may set configuration parameters to prioritize environmental conditions.

In another embodiment, the configuration parameters module 240 may store or receive configuration parameters for threshold values. In one example, a user may set temperature threshold values, humidity threshold values, precipitation threshold values, or the like. In another example, the user may set multiple threshold values, such as multiple temperature threshold values as previously described.

In another embodiment, the configuration parameters module 240 may store or receive configuration parameters for adjustment settings. The adjustment settings may identify windows to adjust, how far to adjust windows, when to initiate adjustments, or the like.

In one embodiment, the configuration parameter module 240 may store configuration parameters that indicate a preference towards humidity as opposed to temperature. For example, a user may desire lower humidity regardless of temperature. In this example, the user may define configuration parameters to only adjust windows of the automobile when the relative humidity outside is lower than the relative humidity inside. Therefore, in this example, although temperature may increase, the cooling module 160 may not adjust windows of the automobile, but only based on humidity. Of course, other environmental conditions may be preferred, and the environment module 120 may prioritize environmental conditions accordingly.

In another embodiment, the configuration parameters module 240 may include a user interface to allow a user to modify configuration parameters. In certain embodiments, the user may modify automobile state parameters, adjustment settings, threshold settings, environment settings, or the like.

In another embodiment, the configuration parameter module 240 may store sets of configuration parameters for respective users of the automobile. For example, an automobile may be associated with two distinct users. One of the users may set a first set of configuration parameters using the configuration parameter module 240, and the other user may set a different set of configuration parameters using the configuration parameter module 240. The configuration parameter module 240 may apply one set of configuration parameters based on one of the users using the automobile. The environment module 120, the threshold module 140, and the cooling module 160 may perform their respective functions based on the appropriate set of configuration parameters as previously described.

In another embodiment, the apparatus 200 may include the air flow module 260. The air flow module 260 may be configured to enable a fan in response to the threshold module 140 determining that a temperature sensed by the environment module 120 exceeds a temperature threshold value. In one example, a temperature threshold value may be 110 degrees Fahrenheit. The air flow module 260 may turn on a fan for the automobile in response to the threshold module 140 determining that an air temperature exceeds 110 degrees Fahrenheit.

In one example, the air flow module 260 may turn on a fan at a low setting in response to the temperature exceeding a temperature threshold. A "low" setting may include turning on a fan of the automobile at a lowest setting as indicated by manual controls of the automobile. In another example, the air flow module 260 may turn on a fan at a high setting in response to the temperature exceeding another temperature threshold. A "high" setting may include setting the fan of the automobile at a setting that is higher than the "low" setting. Of course, many different fan speeds may be used depending on the capabilities of the fan in the automobile, and the air flow module 260 may increase the speed of the fan in response to the air temperature in the automobile increasing.

In one embodiment, the air flow module 260 may command an air cabin fan for the automobile. In another embodiment, the air flow module 260 may turn on a fan for the automobile at timed intervals. For example, the air flow module 260 may enable a fan of the automobile for 10 minutes, and then turn the fan off. This may limit use of electrical power.

In another embodiment, the air flow module 260 may not enable a fan for the automobile based on the automobile being powered off for a long period of time. For example, in response to the automobile being powered off for a week or longer, the air flow module 260 may not enable a fan of the automobile. This may also limit electrical usage over a period of time, and may not drain a battery for the automobile. Therefore, in one embodiment, the air flow module 260 may periodically operate a fan for the automobile up to a threshold number of days.

In another embodiment, the apparatus 200 may include the reserve power module 280. In one embodiment, the reserve power module 280 may determine an amount of reserve power available. In another embodiment, the cooling module may or may not open one or more windows in response to the amount of reserve power available. In one example, the reserve power module 280 may determine that there is sufficient reserve power available, and the cooling module 160 may adjust one or more windows of the automobile as previously described. In another example, the reserve power module 280 may determine that there is insufficient reserve power available, and the cooling module 160 may close windows of the automobile that had been opened. In another example, based on there being an insufficient amount of reserve power available, the cooling module may stop adjusting one or more windows of the automobile based on an environmental condition. In another example, the cooling module 160 may close one or more windows in response to the environment module 120 detecting precipitation at the automobile.

In one embodiment, the reserve power module 280 may include a separate power system for the cooling module 160 to use to adjust the one or more windows and/or to run a fan for the automobile. For example, electrical power for adjusting the one or more windows may come from a secondary battery of the automobile. This may prevent the cooling module 160 from draining a battery used to start the automobile. In another embodiment, the reserve power module 280 may include a solar panel, or other means for acquiring electrical power for the cooling module 160.

In another embodiment, the reserve power module 280 may continually monitor the amount of reserve power available, and may notify the cooling module 160 when reserve power passes below a low power threshold.

Figure 3:
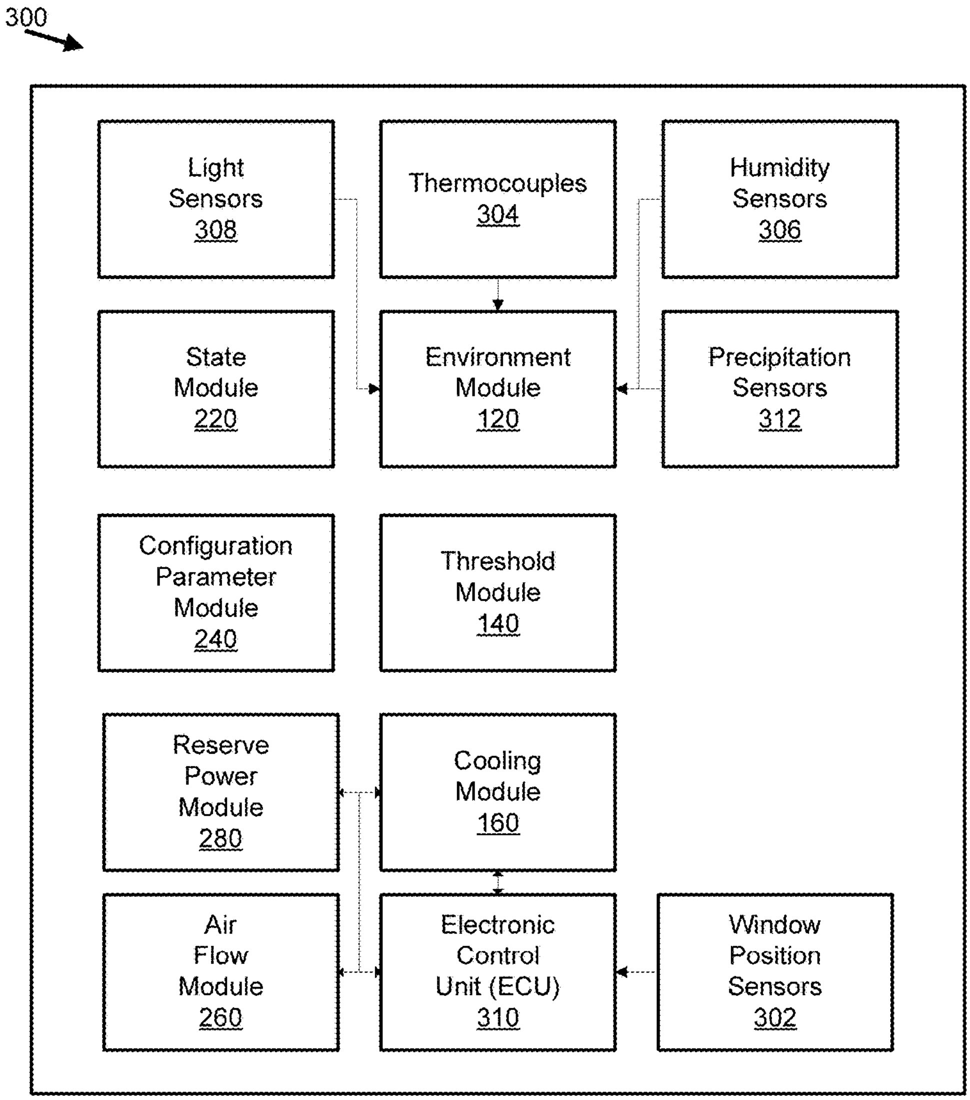
FIG. 3 is an illustration depicting an apparatus including an electronic control unit in accordance with one embodiment.

FIG. 3 is an illustration depicting an apparatus 300 including an electronic control unit 310 in accordance with one embodiment. In one embodiment, the apparatus 300 may include various sensors, such as, but not limited to window position sensors 302, thermocouples 304, humidity sensors 306, light sensors 308, precipitation sensors 312, or the like. In another embodiment, the apparatus 300 may include an electronic control unit (ECU) for the automobile, the environment module 120, the state module 220, the configuration parameter module 240, the threshold module 140, the reserve power module 280, the cooling module 160, and the air flow module 260.

In one embodiment, the environment module 120 may communicate with the various sensors 308, 304, 306, 312. The environment module 120 may communicate with the state module 220. The threshold module 140 and the configuration parameters module 240 may communicate with other modules, such as, but not limited to, the environment module 120, the reserve power module 280, the cooling module 160, and the air flow module 260. The cooling module 160 may communicate with the reserve power module 280. In one embodiment, the cooling module 160 may communicate with the ECU in order to adjust the one or more windows. In another embodiment, the air flow module 260 may communicate with the ECU to turn on a cabin fan for the automobile. In another embodiment, the environment module 120, the threshold module 140, and the cooling module 160 may be included in the ECU for the automobile.

Figure 4:
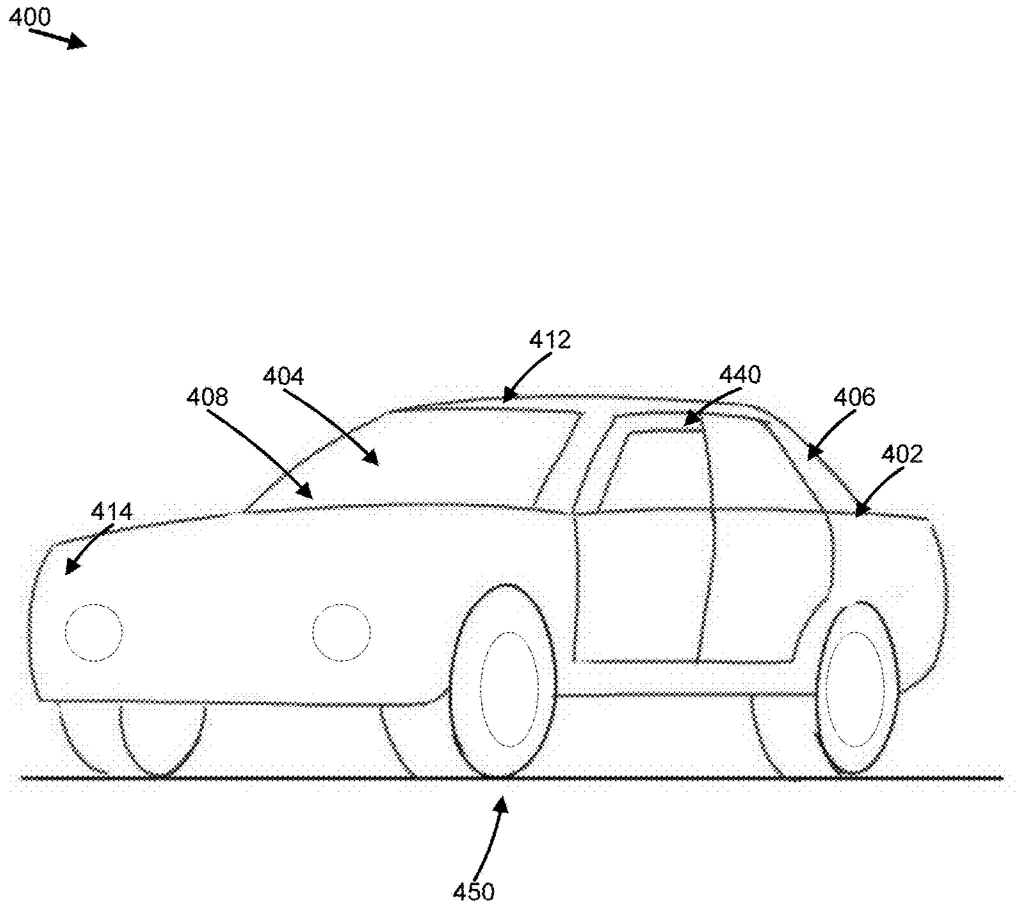
FIG. 4 is another illustration illustrating one example scenario in accordance with one embodiment.

FIG. 4 is another illustration illustrating one example scenario 400 in accordance with one embodiment. In one embodiment, an automobile 450 may be configured to include an outside temperature sensor 402, an inside temperature sensor 404, an outside humidity sensor 406, an inside humidity sensor 408, a precipitation sensor 412, and a light sensor 414. The sensors 402, 404, 406, 408, 412, 414 may be placed in a wide variety of different locations at the automobile as one skilled in the art may appreciate. In other embodiments, the automobile 450 may include a subset of the sensors 402, 404, 406, 408, 412, 414. For example, the automobile 450 may include temperature and precipitation, and may not include humidity. In one example, the cooling module 160 may lower the driver window 440 based on the environment module 120 sensing a temperature, and the threshold module 140 determining that the sensed temperature exceeds a temperature threshold value.

Figure 5:
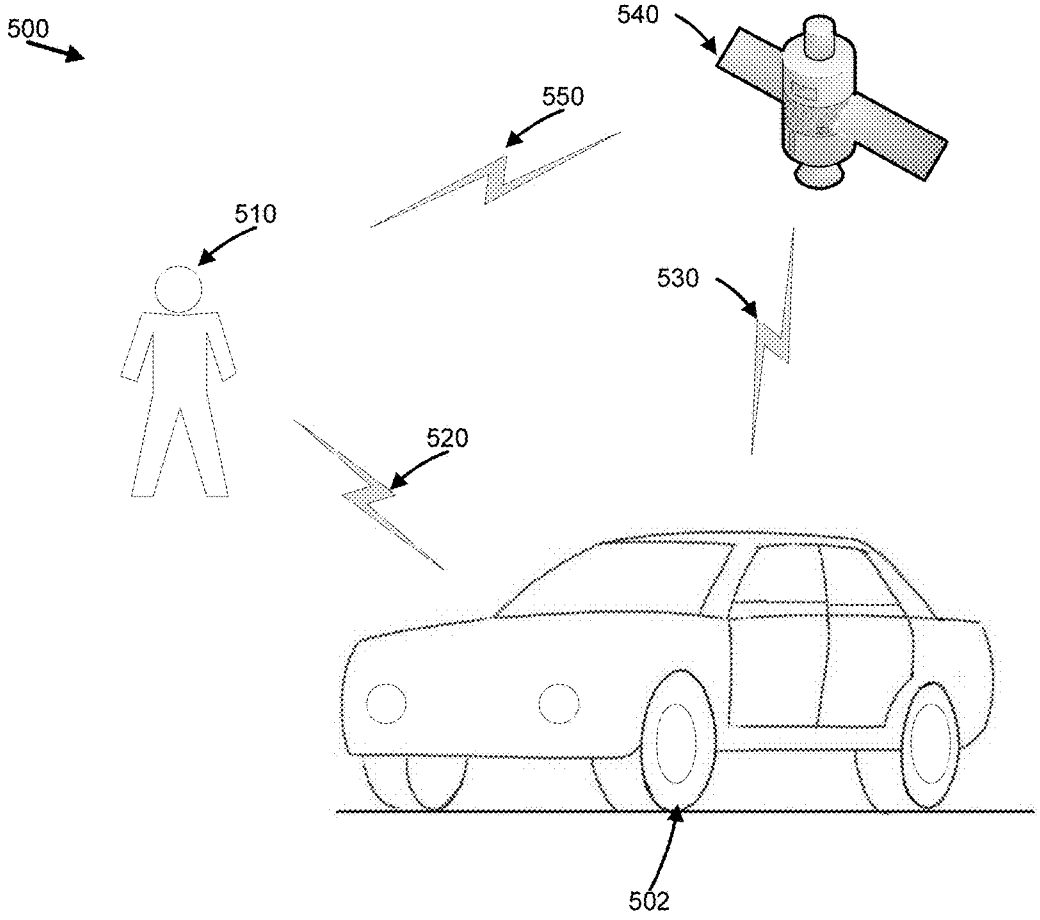
FIG. 5 is an illustration illustrating one example scenario in accordance with one embodiment.

FIG. 5 is an illustration illustrating one example scenario 500 in accordance with one embodiment. In one embodiment, a user may communicate with the environment module 120, the threshold module 140, and/or the cooling module 160 remotely. The communications link 520 between the automobile and a device of the user may include, any wireless communication protocol or standard as one skilled in the art may appreciate.

In another embodiment, the cooling module 160 may lower windows of the automobile 502 based on the user 510 approaching the automobile 502. Approaching the automobile 502 may include the user 510 moving within a certain threshold distance of the automobile 502. For example, the user 510 may move to within 100 feet of the automobile, and the cooling module 160 may lower one or more windows of the automobile. Lowering more than one windows of the automobile substantially down may cool the interior of the automobile more quick than adjusting one or more windows partially down. Furthermore, because the user is within a certain distance from the automobile, there is less concern for the security of the vehicle.

In another embodiment, the cooling module 160 may return adjusted windows to initial or original positions based on the user 510 approaching the automobile 502. If the cooling module 160 had partially lowered one or more windows of the automobile 502, the cooling module 160 may close the one or more adjusted windows of the automobile in response to the user 510 approaching the automobile. The cooling module 160 may determine that the user is approaching the automobile based on establishing a communication link 520 between the user 510 and the automobile 502. In one example, the user may press a button on a remote controller for the automobile 502. In another example, the user may use a cellular device, or other wireless device to communicate with the automobile 502. In another example, the cooling module 160 may determine that the user is approaching the automobile based on data received via a link 530 with a satellite 540, or the like. For example, a satellite signal may include a location of the user 510. Of course, one skilled in the art may appreciate may other ways a cooling module 160 may determine when a user is approaching the automobile, and this disclosure is not limited in this regard.

Figure 6A:
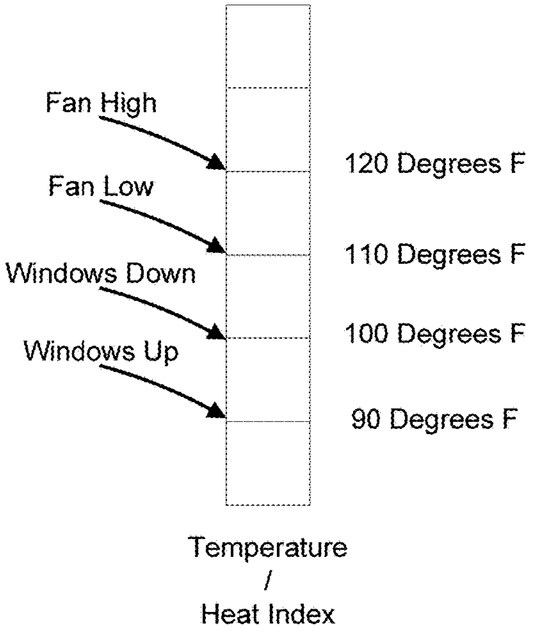
FIG. 6A is a chart illustrating one example scenario in accordance with one embodiment.

FIG. 6A is a chart illustrating one example scenario in accordance with one embodiment. In one example, the interior of an automobile may be 95 degrees Fahrenheit. The degrees depicted in FIG. 6A may be air temperature, or a heat index as previously described. The windows of the automobile may be up or substantially closed. As the temperature rises past 100 degrees Fahrenheit, the cooling module 160 may partially lower one or more windows. If the temperature continues to rise past 110 degrees Fahrenheit, the air flow module 260 may start a cabin fan at a first setting that may be a "low" setting. If the temperature continues to rise past 120 degrees Fahrenheit, the air flow module 260 may increase a speed of the cabin fan to a "high" setting. If the temperature falls below 120 degrees Fahrenheit, the air flow module 260 may reduce a speed of the cabin fan to the "low" setting. If the temperature falls below 110 degrees Fahrenheit, the air flow module 260 may stop the cabin fan. If the temperature falls below 90 degrees Fahrenheit, the cooling module 160 may substantially close the windows of the automobile.

In one example, there may be a temperature buffer zone at each decision degree. For example, in response to the temperature increasing, and the buffer zone is 4 degrees, the cooling module 160 may lower one or more windows of the automobile after the temperature exceeds 104 degrees. In response to the temperature decreasing, the cooling module 160 may raise the one or more windows of the automobile after the temperature falls below 96 degrees Fahrenheit. This may limit the cooling module 160 lower and raising the windows in a scenario where the temperature oscillates around a certain temperature boundary, such as 100 degrees Fahrenheit, 110 degrees Fahrenheit, and/or 120 degrees Fahrenheit.

In another example, the cooling module 160 may adjust by lowering one or more windows of the automobile in response to the temperature exceeding 100 degrees Fahrenheit, however, may raise the one or more windows in response to the temperature falling below 90 degrees Fahrenheit. Therefore, in certain examples, threshold values may or may not similar when a temperature is increasing past a threshold value vs. when a temperature is falling below a threshold value.

Figure 6B:
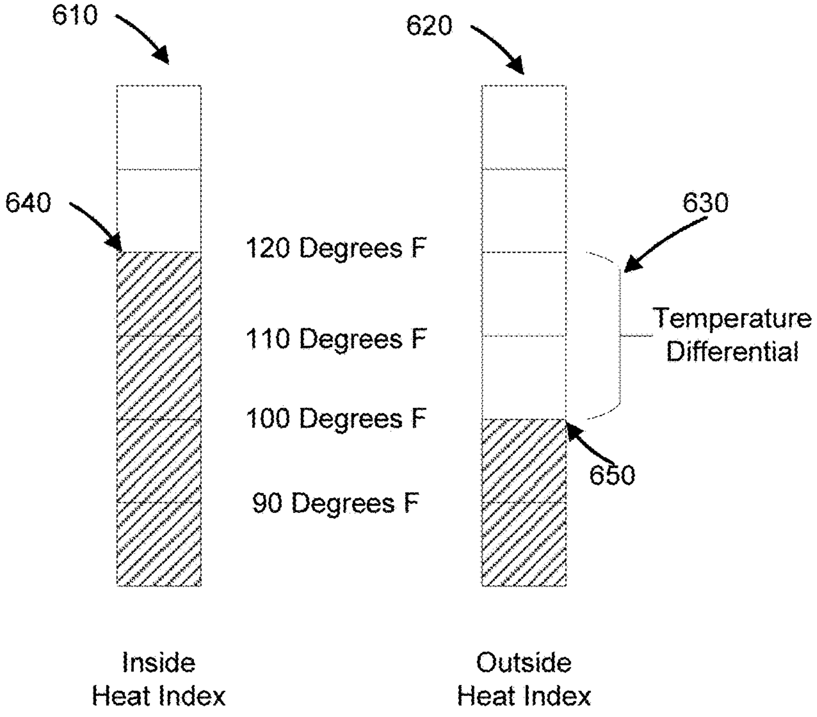
FIG. 6B is a chart illustrating one example scenario in accordance with one embodiment.

FIG. 6B is a chart illustrating one example scenario in accordance with one embodiment. In FIG. 6B, the environment module 120 may sense a heat index value 640 inside 610 an automobile as well as a heat index value 650 outside 620 the automobile. The environment module 120 may determine a temperature difference 650 between the inside temperature and the outside temperature. In one example, an inside heat index 640 may be 120 degrees Fahrenheit while an outdoor heat index 650 may be 100 degrees Fahrenheit.

The threshold module 140 may store a differential threshold temperature of 20 degrees Fahrenheit. In response to the temperature differential 630 exceeding the stored differential threshold temperature, the cooling module 160 may adjust one or more windows of the automobile.

Figure 7:
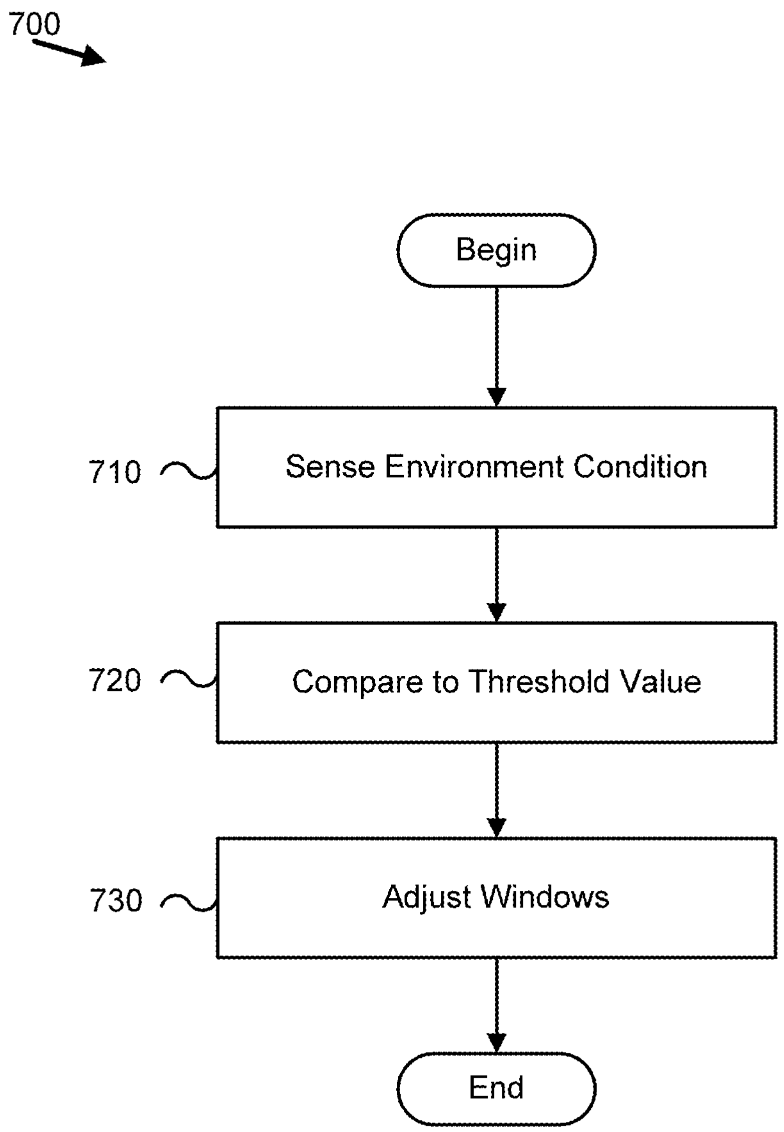
FIG. 7 is schematic flow chart diagram illustrating one embodiment of a method for low power environment management for an automobile.

FIG. 7 is schematic flow chart diagram illustrating one embodiment of a method for low power environment management for an automobile. The method 700 may begin and the environment module 120 may sense an environmental condition at an automobile. A threshold module 140 may compare a level of the environmental condition to a selected threshold value. A cooling module 160 may adjust the opening of one or more windows of the automobile based on the sensed environmental condition, and the method may end.

Figure 8:
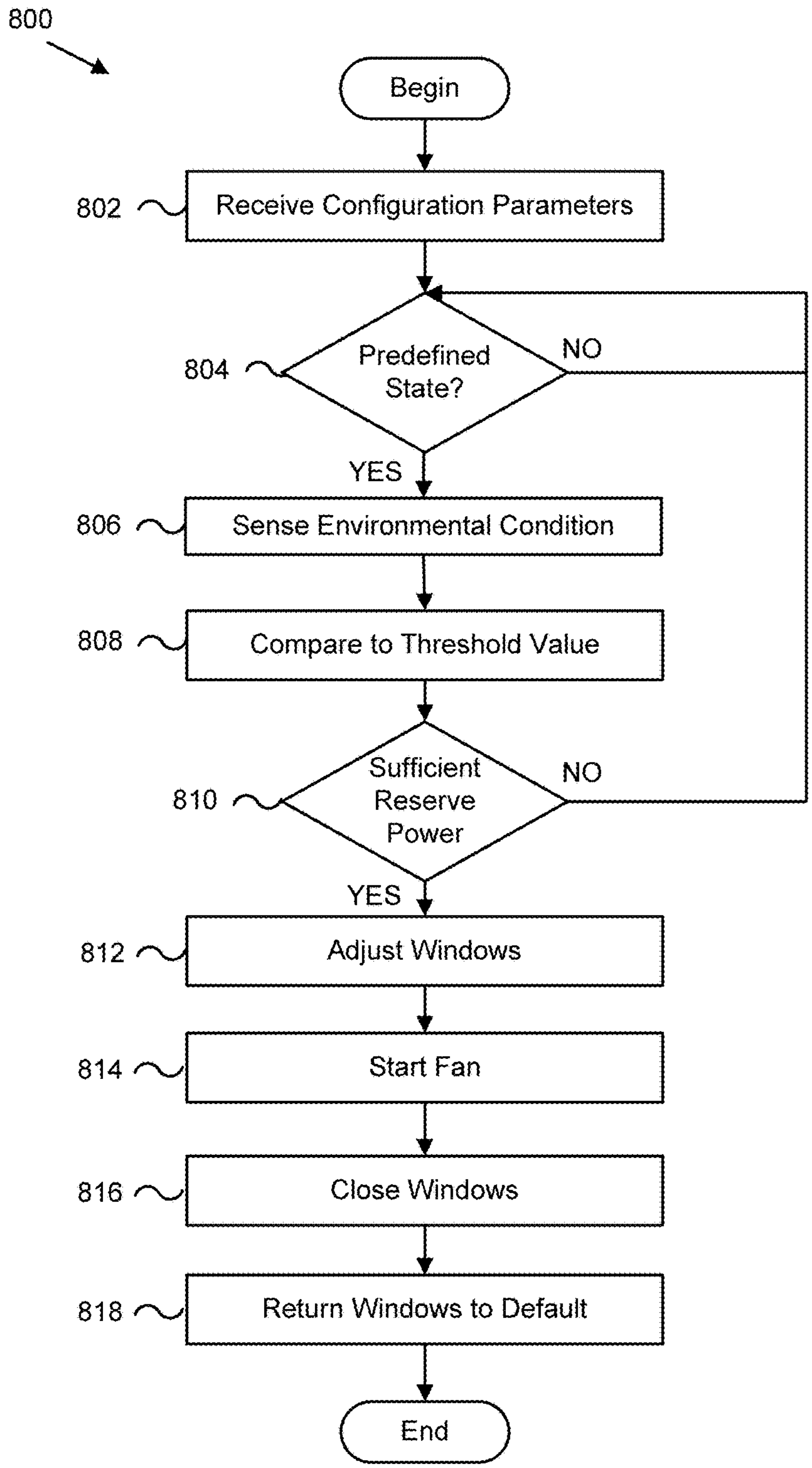
FIG. 8 is another schematic flow chart diagram illustrating one embodiment of a method for low power environment management for an automobile.

FIG. 8 is another schematic flow chart diagram illustrating one embodiment of a method for low power environment management for an automobile. In one embodiment, the method 800 may begin and a configuration parameters module may receive 802 a set of configuration parameters. The state module 220 may monitor a state of the automobile and determine 804 if the state is in a predefined state. If the automobile is not in a predefined state, the state module 220 may continue monitoring the state of the automobile. If the automobile is in the predefined state, the cooling module 160 may determine 804 to initiate low power environment management in the automobile based on the state.

The environment module may sense 806 an environmental condition at an automobile. A threshold module 140 may compare 808 a level of the environmental condition to a selected threshold value. The reserve power module 280 may monitor an amount of reserve power for the automobile. If there is insufficient reserve power the method may return to determine 804 a state of the automobile. If there is sufficient reserve power available to the automobile, the cooling module 160 may adjust the one or more windows. The air flow module 260 may start 814 a fan for the automobile. The cooling module 160 may close 816 one or more windows of the automobile in response to the environmental condition comprising precipitation. The cooling module 160 may close 816 one or more windows of the automobile in response to a terminating event. The terminating event may include a user returning to the automobile, the method exceeding a time threshold, the automobile lacking sufficient reserve power, an interior of the automobile meeting a temperature threshold, or the like. The cooling module 160 may return 818 windows of the automobile to a default position in response to a user of the automobile starting the automobile.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a processor;

an environmental sensor;

one or more windows;

a fan;

an automobile body that houses the processor, the environmental sensor, the one or more windows, and the fan;

one or more motors housed by the automobile body that translate the automobile body;

an environment module that:

determines an environmental condition based on environment data sensed at the environmental sensor in response to a user remotely commanding the automobile to initiate a low power environment management system for a plurality of different components of the automobile, the low power environment management system comprising a secondary power source that is separate from a primary power source of the automobile, the environmental sensor sensing the environment data in response to receiving the remote command, the environmental condition comprising an air temperature and a relative humidity; and calculates a heat index based on the air temperature and the relative humidity;

a reserve power module that determines an amount of reserve power available, the reserve power generated by the secondary power source;

a threshold module that compares the calculated heat index to a heat index threshold and compares the available amount of reserve power to a reserve power threshold;

a cooling module that adjusts an opening of the one or more windows based on the calculated head index satisfying the heat index threshold; and an air flow module that enables the fan based on the calculated head index satisfying the heat index threshold and responsive to the available amount of reserve power satisfying the reserve power threshold, the fan being enabled for a period of time determined as a function of an amount of available reserve power.

2. The apparatus of claim 1, further comprising a state module that monitors a state of the apparatus, the environmental condition being determined in response to the state.

3. The apparatus of claim 1, further comprising a configuration parameter module that stores configuration parameters, the configuration parameters comprising environment settings, threshold values, and adjustment settings, wherein an environmental condition is determined based on the environment settings, and the opening of the one or more windows is adjusted based on the adjustment settings.

4. The apparatus of claim 1, wherein the air flow module further enables the fan in response to the environmental condition comprising temperature, the temperature exceeding the selected threshold value.

5. The apparatus of claim 1, wherein the opening of the one or more windows is adjusted based on the amount of reserve power available.

6. The apparatus of claim 1, wherein the cooling module further opens the one or more windows in response to a user of the automobile approaching the automobile, the opening of the one or more windows adjusted by lowering one or more windows down.

7. The apparatus of claim 1, wherein the environment module determines an environmental condition in response to an initiation event, the initiation event selected from the group consisting of a user turning off the automobile, the user locking the automobile, and the user remotely commanding the automobile.

8. The apparatus of claim 7, wherein the environment module determines the environmental condition based on the automobile being powered off, the environmental condition comprising temperature, the one or more windows opened in response to the temperature exceeding a selected temperature threshold.

9. The apparatus of claim 8, wherein an opening of the one or more windows comprises the one or more windows being opened less than 0.5 inches.

10. A method comprising:

receiving a command, remotely, to initiate a low power environment management system that comprises a secondary power source that is separate from a primary power source of an automobile, the low power environment management system managing a plurality of different components of the automobile;

determining, by use of a processor, an environmental condition based on environment data sensed by an environmental sensor at the automobile, the environmental sensor sensing the environment data in response to receiving the remote command, the environmental condition comprising an air temperature and a relative humidity;

calculating a heat index based on the air temperature and the relative humidity;

determining, by use of the processor, an amount of reserve power available, the reserve power generated by the secondary power source;

comparing, by use of the processor, the calculated heat index to a heat index threshold;

comparing, by use of the processor, the available amount of reserve power to a reserve power threshold;

adjusting, by use of the processor, the opening of the one or more windows based on the calculated head index satisfying the heat index threshold; and enabling, by use of the processor, a fan based on the calculated head index satisfying the heat index threshold and responsive to the available amount of reserve power satisfying the reserve power threshold, the fan being enabled for a period of time determined as a function of an amount of available reserve power.

11. The method of claim 10, further comprising determining to initiate low power environment management in the automobile based on a state of the automobile.

12. The method of claim 10, wherein the environmental condition is selected from the group consisting of temperature, humidity, light, and precipitation.

13. The method of claim 10, further comprising receiving a set of configuration parameters, the configuration parameters selected from the group consisting of sensor settings, comparison settings, and adjustment settings.

14. The method of claim 10, further comprising closing one or more windows of the automobile in response to a terminating event, the terminating event selected from the group consisting of a user returning to the automobile, exceeding a time threshold, insufficient reserve power, and meeting a temperature threshold.

15. The method of claim 10, further comprising monitoring the amount of reserve power for the automobile, the adjusting based on the amount of available reserve power.

16. The method of claim 10, further comprising closing the windows of the automobile in response to the environmental condition comprising precipitation.

17. The method of claim 10, further comprising starting a fan for the automobile, wherein the environmental condition comprises temperature exceeding a temperature threshold.

18. The method of claim 10, further comprising returning windows of the car to a default position in response to a user of the automobile starting the automobile.

19. An apparatus comprising:

a processor;

a memory that stores code executable by the processor, the code comprising:

an environment module that:

determines an environmental condition based on environment data sensed at the environmental sensor in response to a user remotely commanding an automobile to initiate a low power environment management system, the low power environment management system managing a plurality of different components of the automobile, the low power environment management system comprising a secondary power source that is separate from a primary power source of the automobile, the environmental sensor sensing the environment data in response to receiving the remote command, the environmental condition comprising an air temperature and a relative humidity; and calculates a heat index based on the air temperature and the relative humidity;

a reserve power module that determines an amount of reserve power available, the reserve power generated by the secondary power source;

a threshold module that compares the calculated heat index to a heat index threshold and compares the available amount of reserve power to a reserve power threshold;

a cooling module that adjusts an opening of the one or more windows based on the calculated head index satisfying the heat index threshold; and an air flow module that enables the fan based on the calculated head index satisfying the heat index threshold and responsive to the available amount of reserve power satisfying the reserve power threshold, the fan being enabled for a period of time determined as a function of an amount of available reserve power.

20. The apparatus of claim 19, wherein the cooling module further closes the windows in response to the environmental condition comprising precipitation.

* * * * *